United States Patent [19]

Spicer

[11] 4,405,098
[45] Sep. 20, 1983

[54] EXTENDED PLAY CASSETTE

[75] Inventor: Barry K. Spicer, Riverside, Calif.

[73] Assignee: Technicolor, Inc., Los Angeles, Calif.

[21] Appl. No.: 267,560

[22] Filed: May 27, 1981

[51] Int. Cl.³ .................. G03B 1/04; G11B 15/32; G11B 23/04

[52] U.S. Cl. ..................................... 242/200; 360/132

[58] Field of Search ............. 242/180, 197–200; 360/93, 94, 96.5, 132, 85; 352/72–78

[56] References Cited

U.S. PATENT DOCUMENTS

| | | | |
|---|---|---|---|
| 1,207,298 | 6/1915 | Kircher | 242/55.19 R |
| 3,250,481 | 5/1966 | Seki | 242/55.13 |
| 3,278,252 | 10/1966 | Wagner | 352/72 |
| 3,352,976 | 11/1967 | Gonmori | 179/100.2 |
| 3,415,599 | 12/1968 | Winkler et al. | 352/78 |
| 3,475,089 | 3/1970 | Funck | 352/156 |
| 3,504,135 | 3/1970 | Hammond | 179/100.2 |
| 3,568,943 | 3/1971 | Robak | 242/55.19 |
| 3,625,454 | 12/1971 | Van Der Maaden | 242/180 |
| 3,640,479 | 2/1972 | Hata | 242/55.19 |
| 3,664,603 | 5/1972 | Eskay | 242/180 |
| 3,719,417 | 3/1973 | Lecoeur | 352/78 |
| 3,791,609 | 2/1974 | Roma | 242/201 |
| 3,804,498 | 4/1974 | Lopata et al. | 352/78 |
| 3,819,130 | 7/1974 | Moxness | 242/199 |
| 3,861,621 | 1/1975 | Takeichi et al. | 242/197 |
| 3,900,170 | 8/1975 | Serizawa | 242/198 |
| 3,900,171 | 8/1975 | Serizawa | 242/198 |
| 3,900,172 | 8/1975 | Kamaya | 242/198 |
| 3,918,802 | 10/1975 | Sakaguchi et al. | 352/72 |
| 3,949,952 | 4/1976 | Chandler et al. | 242/194 |
| 3,950,785 | 4/1976 | Findley | 360/94 |
| 4,018,518 | 4/1977 | Wright | 352/78 |
| 4,034,935 | 7/1977 | Plaza et al. | 242/197 |
| 4,056,834 | 11/1977 | Hiroyasu | 360/85 |
| 4,074,876 | 2/1978 | Gourley | 242/199 |
| 4,173,319 | 11/1979 | Umeda | 242/199 |
| 4,195,796 | 4/1980 | Osanai | 242/199 |
| 4,201,356 | 5/1980 | Schoettle | 242/197 |

*Primary Examiner*—Leonard D. Christian
*Attorney, Agent, or Firm*—Lyon & Lyon

[57] ABSTRACT

An extended play cassette including a housing having an adaptor portion similar in form to a conventional cassette and a magazine portion in stacked relationship to the adaptor portion. The extended play cassette includes hubs within the magazine portion for carrying a web in rolls thereupon, access means in the adaptor portion for providing access to the web by a record/play apparatus, guides between the adaptor portion and the magazine portion for guiding the web therebetween, and a drive train connecting engagement sockets in the adaptor portion to the respective hubs in the magazine portion.

8 Claims, 4 Drawing Figures

EXTENDED PLAY CASSETTE

BACKGROUND

The present invention relates generally to magnetic tape and film cassettes and more particularly to an extended play cassette.

Various cassettes are known which carry magnetic tape or photographic film. For example, such cassettes include the "Phillips" audio cassette, cassettes intended for use with video cassette recorders, and the film cassettes which carry unexposed super-8 motion picture film. Although these cassettes make the loading and unloading of recording and play-back apparatus simple and provide a protected environment for the magnetic tape or film, the standard cassette size limits cassette capacity and thus the cassette play or record time.

One method of increasing the standard cassette play or record time involves using a thinner medium such as thinner magnetic tape. However, as magnetic tape becomes thinner, it also is more easily stretched, broken or crushed, thus disabling the cassette and destroying the information stored on the tape. Moreover, the thickness of photographic film cannot be reduced beneath a limit where the film retains its structural integrity and its ability to withstand repeated manipulations by, for example, a projector.

Several extended play devices have been proposed which are operable in place of a standard cassette and which provide increased magnetic tape or film capacity. Exemplary extended play devices are disclosed in U.S. Pat. Nos. 3,918,802, 3,949,952, 4,018,518 and 4,074,876. All of these extended play devices generally include a portion adapted to fit into the cassette receptable of a record/play apparatus and a portion laterally disposed with respect to the first portion which carries enlarged supply and take-up reels.

However, none of these extended-play devices can be inserted into record/play apparatus where the apparatus requires that a standard cassette be oriented, for example, generally horizontally and then inserted generally vertically into a recessed cassette receptacle. That is, apparatus of this nature are designed to accept the cassette face first rather than edge first and any cassette not conforming to the standard cassette size will not fit into the cassette receptacle. Stated more generally, the standard cassette housing defines a plane (the cassette face) and the cassette must be displaced substantially perpendicularly with respect to this plane (face first) into the cassette receptacle.

With such apparatus, the laterally disposed supply and take-up reels of the aforementioned extended play devices interfere with the insertion of the devices into the cassette receptacle, thus rendering these devices inoperable. This presents a serious drawback to the use of such extended play devices and one which decreases the utility of the record/play apparatus.

Moreover, the extended play devices of the type described above are generally bulky and extend away from the record/play apparatus, thus exposing the devices to potential damage. Such damage can result in the loss of magnetic tape or film carried by the device.

Thus there is a need for an extended play cassette which overcomes the limitations described above and which provides in a relatively compact package substantially increased capacity while minimizing the possibility of accidental damage to the extended play cassette and to the film or magnetic tape carried by the cassette.

SUMMARY OF THE INVENTION

An extended play cassette in accordance with the present invention overcomes the aforementioned limitations and is adapted for use with record/play apparatus which require that a standard cassette be inserted face first. Such apparatus include within the cassette receptacle drive spindles which can engage the hubs of a standard cassette. In accordance herewith, an exemplary extended play cassette includes an adapter member adapted to be received by the cassette receptacle of the record/play apparatus, the adapter member including engagement sockets for receiving drive spindles. The extended play cassette further includes a magazine member disposed in a stacked relationship with the adapter member and connected thereto. The magazine member includes a first and a second hub rotatably carried therein, the hubs carrying a web of record/play media, such as video magnetic tape. A drive means transmits rotational movement from the engagement sockets to the respective hubs and guide means guide the media from the magazine member to the adapter member. The cassette includes an access opening or openings in the adapter member so that the apparatus can withdraw the media from the adapter member as it would from a conventional standard-sized cassette.

It is thus seen that the extended play cassette of the present invention provides a unique and valuable means for extending the capacity of conventional standard-sized cassettes which are used with apparatus that require the cassette to be inserted face first into a recessed cassette receptacle. The inventive cassette of the present invention furthermore is relatively compact and does not significantly extend away from the record/play apparatus to consequently reduce the likelihood of damage to the cassette and the apparatus.

It is thus an object of the present invention to provide an improved extended play cassette.

It is a further object of the present invention to provide a relatively compact extended play cassette.

It is a further object of the present invention to provide an extended play cassette which is adapted for face-first insertion into a record/play apparatus.

DESCRIPTION OF THE DRAWINGS

These and other objects and advantages of the present invention will be apparent from consideration of the following description taken in conjunction with the drawings in which.

DESCRIPTION OF THE EXEMPLARY EMBODIMENT

Figure 1:
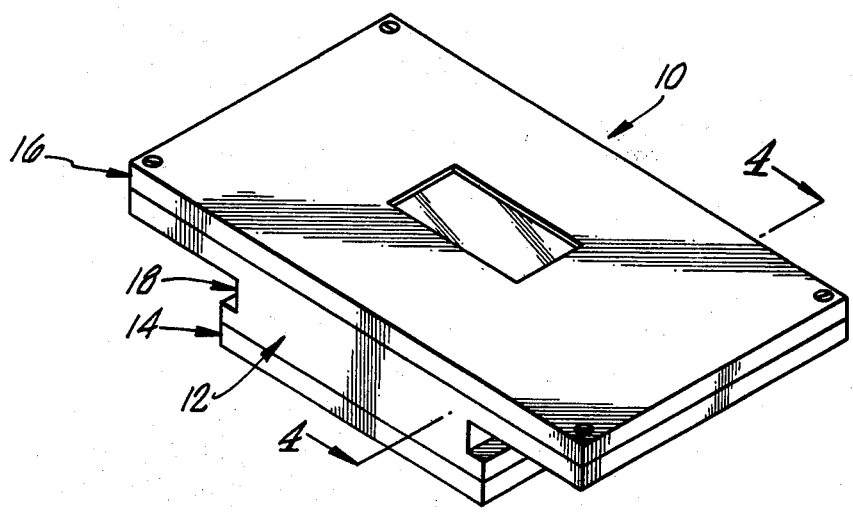
FIG. 1 is a perspective view of an exemplary extended play cassette in accordance with the present invention.

With reference to FIG. 1, an exemplary extended play cassette in accordance with the present invention includes a housing 12, comprising an adapter 14, a magazine 16 and a connecting portion 18. As is apparent from FIG. 1, the magazine 16 is in a stacked relationship with the adapter 14 that is, the magazine 16 is offset or displaced perpendicularly from a plane defined by the adapter 14. When the cassette 10 is oriented horizontally, the magazine 16 is generally above the adapter 14. The magazine 16 may be displaced with respect to the adapter 14 as in FIG. 1 or may be centered directly above the adapter.

Figure 2:
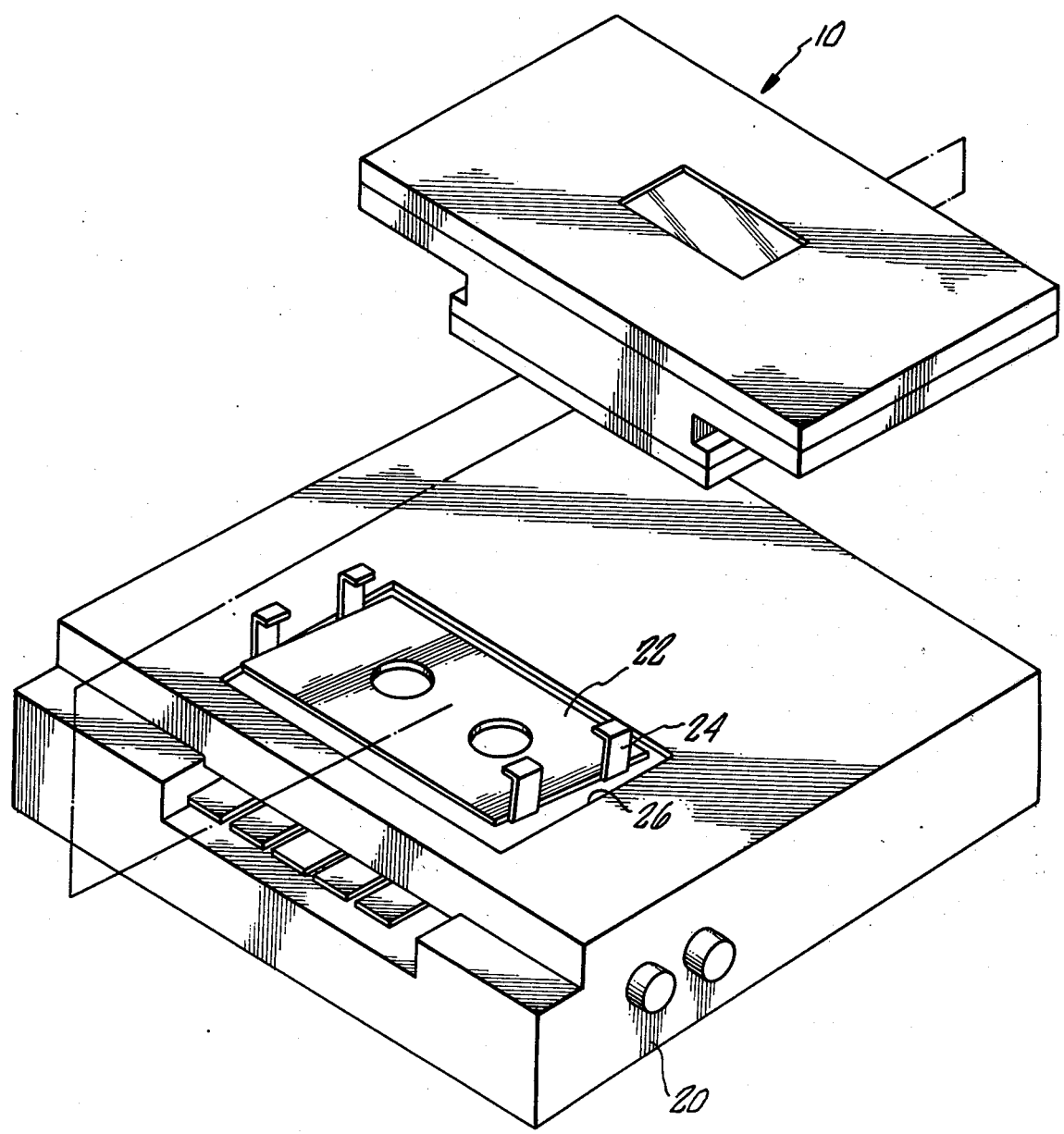
FIG. 2 is a perspective view of the cassette of FIG. 1 and an exemplary record/play apparatus for use therewith.

The adapter 14 is generally the same size and shape as a conventional standard-sized cassette. In an exemplary embodiment, the adapter 14 is the housing of a conventional standard-sized cassette, which is modified for use in the extended play cassette 10. As seen in FIG. 2, the extended play cassette 10 is particularly suited for use with an apparatus such as a video cassette recorder (VCR) 20. The VCR 20 includes a platform 22 having a plurality of guide fingers 24. The cassette 10 is first displaced relatively horizontally so that the adapter 14 is guided by the guide fingers 24 onto the platform 22. Once in place, the cassette 10 and the platform 22 are lowered so as to place the adapter 14 and connecting portion 18 of the cassette 10 within a cassette receptacle 26. It is to be noted that only a standard-sized cassette of similar structure can be lowered into the recessed cassette receptacle 26. The stacked relationship between the magazine 16 and the adapter 14 allows the adapter 14 to be positioned within the recessed cassette receptacle, yet allows the magazine 16 to carry an increased length of video magnetic tape, thereby providing the increased capacity of the extended play cassette 10.

Figure 3:
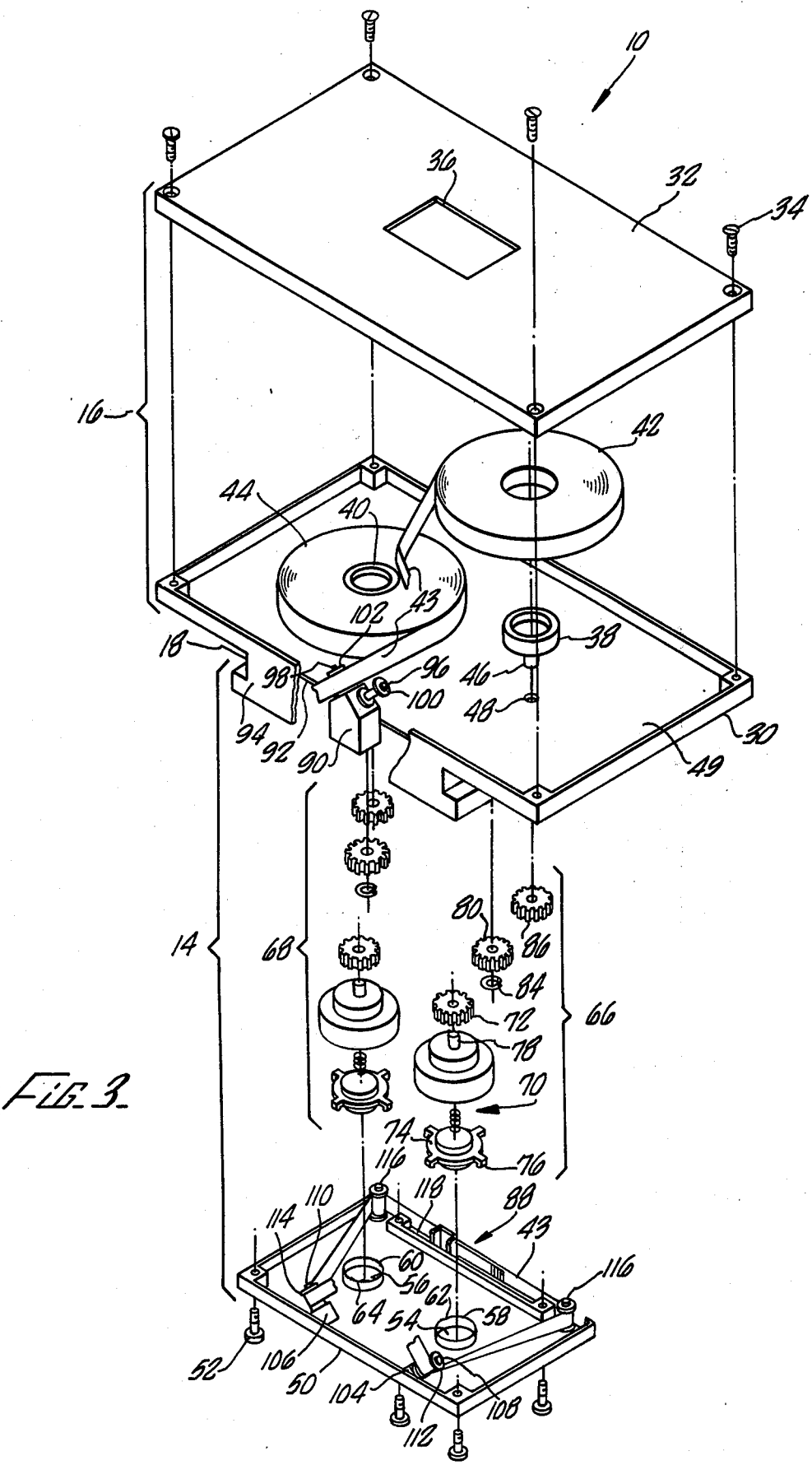
FIG. 3 is an exploded view of the cassette of FIG. 1.

Turning now to FIG. 3, the cassette 10 has a core 30 which includes a lower portion of the magazine 16, the connecting portion 18 and an upper portion of the adapter 14. A cover 32 is secured to the core 30 with a plurality of screws 34 to complete the magazine 16. A rectangular window 36 is included generally in the center of the cover 32 although the window 36 may be of various shapes or more than one window may be provided. Within the magazine 16 are tape supply and accumulation means comprising a supply hub 38 and a take-up hub 40. The supply hub 38 is connected to and carries a supply roll 42 of a suitable web of record/play media such as video magnetic tape 43 and the take-up hub 40 is similarly connected to and carries a take-up roll 44 of video magnetic tape 43. Each of the hubs 38 and 40 includes a shaft 46 which passes through openings 48 in the floor 49 of the magazine 16 into the connecting portion 18. It is to be noted that the hubs 38 and 40 may be axially displaceable with respect to the respective shafts 46 by using a mechanism similar to the engagement mechanism 70 described below. This allows the hubs 38 and 40 to float vertically with respect to shafts 46.

The adapter 14 includes a lower cover 50 which is secured to the core 30 by a plurality of screws 52. The cover 50 includes two openings 54 and 56 which are adapted to receive the take-up and re-wind spindles (not shown) of the VCR 20. The openings 54 and 56 are each surrounded by short cylindrical walls 58 and 60, which each include serrated upper edges 62 and 64.

Figure 4:
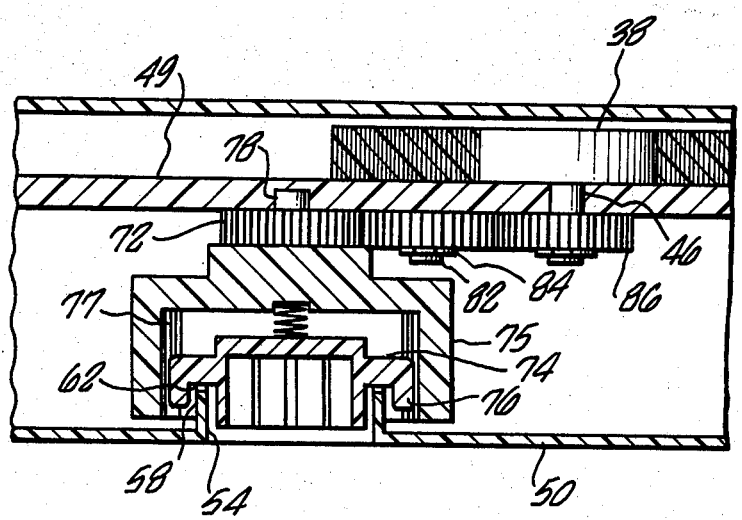
FIG. 4 is a section view of the cassette of FIG. 1 taken along the line 4—4 of FIG. 1.

The cassette 10 includes two linkages or drive trains 66 and 68 which transfer rotational torque from the VCR spindles to the respective hubs 38 and 40. An engagement mechanism 70 is fixed to a gear 72 and includes an inner socket 74 and an outer drum 75 (FIGS. 3 and 4). The inner socket 74 receives the respective drive shaft of the VCR and includes a plurality of arms 76. The arms 76 ride within channels 77 on the inner surface of the drum 75 to allow vertical displacement of the socket 74. A spring 78 disposed coaxially with the socket 74 and the drum 75 urges the socket 74 toward the serrated edges 62 of the cylindrical wall 58. The drum 75 includes a shaft 78 to which is fixed to the gear 72. The shaft is journalled in the lower surface of the floor 49 of the magainze 16 within the connecting portion 18.

The gear 72 is engaged with a gear 80 that is carried on a shaft 82. The shaft 82 is fixed to the lower surface of the floor 49 and a clip spring 84 holds the gear 80 upon the shaft 82. The gear 80 is in turn engaged with a gear 86 which is fixed to the shaft 46 of the supply hub 38 such that the floor 49 is between the supply hub 38 and the gear 86. It is to be understood that the drive train 68 includes components substantially identical to those described for the drive train 66.

The cassette 10 further includes guide means for guiding the tape from the rolls 42 and 44 to an edge 88 of the adapter 14. A pointed member 90 is fixed within a rectangular opening 92 in the floor 49 near a rear wall 94 of the housing 12. The pointed member 90 includes two angled surfaces which support a first pin 96 and a second pin 98. A first roller 100 and a second roller 102 are carried by the pins 96 and 98 respectively. The angled surfaces of the member 90 are disposed at approximately 45 degree angles with respect to vertical such that the included angle between the pins 96 and 98 and the rollers 100 and 102 is approximately 90 degrees.

Two angled supports 104 and 106 are affixed to the lower cover 50 and generally adjacent to the rear wall 94. Two pins 108 and 110 are fixed to the angled supports 104 and 106 respectively and the pins 108 and 110 in turn carry two rollers 112 and 114 respectively. The angled supports carry the pins 108 and 110 and rollers 112 and 114 at approximately 45° angles with respect to the cover 50 such that the included angle between pins 108,110 and rollers 112,114 is approximately 90 degrees. However, the angled supports 104 and 106 are spaced such that the rollers 100, 112 and 102, 113 are aligned so as to carry the tape 43 as is described hereinbelow.

The adapter 14 has formed along the edge 88 thereof suitable guides 116 and an access opening 118 which presents the tape 43 to the tape handling means (not shown) of the VCR so that the tape can be withdrawn from the cassette 10. Thus, the tape 43 is supplied from the supply roll 42 over the rollers 100 and 112 to the guides 116 and the opening 118. The tape 43 then returns via the rollers 114 and 102 to the take-up roll 44.

In use, the cassette 10 is loaded onto the platform 22 and is then lowered into the recessed cassette receptacle 26. Within the receptacle 26, VCR spindles engage the inner sockets 74 of the drive trains 66 and 68 and lift the inner sockets 74 from the serrated edges 62 and 64 to thereby free rotation of the mechanisms 70. Rotation of the VCR spindles is transferred through the drive trains 66 and 68 to the supply roll 42 and the take-up roll 44. The tape 43 may be withdrawn from the cassette 20 for recording or playback by the VCR 20. Upon completion of the recording or playback, the tape 43 is drawn into the cassette 10 by rotating one of the rolls 42 and 44 whereupon the cassette 20 can then be raised from the recessed cassette receptacle and removed from the platform 22.

It is thus apparent that the cassette 10 of the present invention provides a compact extended play cassette which is operable in an apparatus which requires that the cassette be inserted face-first into a cassette receptacle, thus extending the record/play time available from the cassette 10 and increasing the usefulness of the record/play apparatus.

It is to be noted that the connecting portion 18 is recessed from the edges of the adaptor 14 so that the cassette 10 can be slipped on to the platform 22 between the platform 22 and the guide fingers 24. However, the connecting portion 18 need not be recessed where the record/play apparatus does not include structure similar to the guide fingers 24 and may be readily adapted to the requirements of the particular record/play apparatus.

While an exemplary embodiment of the invention has been described, it is to be understood that the invention is not limited to the details herein explained. It is expected that those skilled in the art will recognize numerous variations and equivalents which come within the spirit of the invention and which are intended to be included herein.

What is claimed is:

1. An extended play cassette for providing increased web storage capacity for use with an apparatus having a cassette receptacle and winding means in the receptacle for engaging the cassette and for winding the web within the cassette, the cassette comprising,
   adapter means for being received by the cassette receptacle including access means to provide access to the web by the apparatus and engagement means for engaging the winding means,
   second means disposed in a stacked relationship with the adapter means and connected thereto, including web supply and accumulation means for supplying the web from and accumulating the web into the second means,
   means for transmitting rotational motion from the engagement means to the web supply and accumulation means, and
   guide means for guiding the web from the web supply and accumulation means to the access means.

2. A cassette as in claim 1 wherein the guide means includes
   first roller means within the adapter means angled with respect to a plane defined by the adapter means and
   second roller means within the second means and angled with respect to a plane defined by the magazine member for feeding the web from the first roller means to the web supply and accumulation means, the first roller means being for feeding the web from the access means to the second roller means.

3. A cassette as in claim 2 wherein the means for transmitting rotational motion, includes a plurality of gears adapted to transfer rotational movement from the engagement means to the web supply and accumulation means.

4. An extended play cassette for providing increased web storage capacity for use with an apparatus wherein the apparatus includes a cassette receptacle for receiving a conventional cassette, wherein the conventional cassette includes a housing and hubs within the housing which carry the web, the cassette receptacle being adapted to receive the conventional cassette along an axis substantially perpendicular to a plane defined by the housing, the cassette receptacle including spindles adapted to engage the hubs and web handling means for engaging the web, the extended play cassette comprising,
   an adaptor portion adapted to be received by the receptacle, including access means for providing access to the web by the web handling means, engagement means for engaging the spindles, and guide means for guiding the web to the access means,
   a magazine portion disposed in a stacked relationship with the adapter portion and connected thereto, including a first and a second hub rotatably carried within the magazine portion, the hubs adapted to carry the web in rolls thereupon, and guide means for guiding the web from the rolls to the adapter portion guide means, and
   means for transmitting rotational movement from the engagement means to the first and second hubs.

5. An extended play cassette for providing increased web storage capacity for use with an apparatus wherein the apparatus includes a cassette receptacle for receiving a conventional cassette, wherein the conventional cassette includes a housing having hubs therein, the hubs carrying the web, the cassette receptacle being adapted to receive the conventional cassette along an axis substantially perpendicular to a plane defined by the conventional cassette housing, the cassette receptacle including spindles adapted to engage the hubs of the conventional cassette and web handling means for engaging the web, the extended play cassette comprising,
   a housing having an adaptor portion substantially similar in form to the housing of a conventional cassette, a magazine portion in stacked relationship with the adapter portion and integral therewith, and an opening between the adapter portion and the magazine portion,
   the adapter portion including access means for providing access to the web by the web handling means, engagement means for engaging the spindles, and guide means for guiding the web from the access means through the opening,
   the magazine portion including a first and a second hub rotatably carried within the magazine portion, the hubs adapted to carry the web in rolls thereupon, and guide means for guiding the web from the rolls through the opening to the adapter portion guide means, and
   drive means for transmitting rotational motion from the engagement means to the first and second hubs.

6. A system for providing increased web storage capacity, comprising
   an apparatus having a cassette receptacle for receiving a conventional cassette, wherein the cassette receptacle is adapted to receive the conventional cassette along an axis substantially perpendicular to a plane defined by the cassette receptacle, the cassette receptacle including spindles adapted to engage hubs of the conventional cassette, and web handling means; and
   an extended play cassette comprising
   adapter means for being received by the cassette receptacle including access means to provide access to the web by the web handling means and engagement means for engaging the spindles,
   magazine means connected to the adapter means and offset from a plane defined by the adapter means for supplying the web to the access means and for accumulating the web from the adapter means, said offset allowing the adapter means to be received by the cassette receptacle, and means for transmitting rotational motion from the engagement means to the magazine means.

7. An extended play cassette for providing increased web storage capacity for use with an apparatus having a cassette receptacle wherein the cassette receptacle is adapted to receive a conventional cassette along an axis substantially perpendicular to a plane defined by the cassette receptacle, the cassette receptacle including web handling means and spindle means for engaging the cassette and for winding the web within the cassette, the extended play cassette comprising adapter means for being received by the cassette receptacle including access means to provide access to the web by the web handling means and engagement means for engaging the spindle means, magazine means connected to the adapter means and offset from a plane defined by the adapter means for supplying the web to the access means and for accumulating the web from the adapter means to thereby allow the adapter means to be received by the cassette receptacle, and means for transmitting rotational motion from the engagement means to the magazine means.

8. A method for extending the web used by an apparatus wherein the apparatus includes a cassette receptacle, winding means in the receptacle for engaging a cassette and for winding the web within the cassette, and web handling means within the receptacle for engaging the web, the cassette receptacle defining a plane, the method comprising the steps of positioning the web within the cassette receptacle for access by the web handling means, supplying the web into the cassette receptacle from a magazine outside the cassette receptacle, the magazine being offset from the plane defined by the cassette receptacle, accumulating the web from the cassette receptacle, and coupling rotational motion from the winding means to the magazine.

* * * * *